(12) United States Patent
Bigioi et al.

(10) Patent No.: US 9,323,979 B2
(45) Date of Patent: Apr. 26, 2016

(54) FACE RECOGNITION PERFORMANCE USING ADDITIONAL IMAGE FEATURES

(71) Applicant: DigitalOptics Corporation Europe Limited, Galway (IE)

(72) Inventors: Petronel Bigioi, Galway (IE); Gabriel Costache, Galway (IE); Alexandru Drimbarean, Galway (IE); Peter Corcoran, Claregalway (IE)

(73) Assignee: Digitaloptics Corporation Europe Limited, Ballybrit, Galway (IE)

( * ) Notice: Subject to any disclaimer, the term of this patent is extended or adjusted under 35 U.S.C. 154(b) by 0 days.

(21) Appl. No.: 14/562,366

(22) Filed: Dec. 5, 2014

(65) Prior Publication Data

US 2015/0086076 A1 Mar. 26, 2015

Related U.S. Application Data

(63) Continuation of application No. 13/753,426, filed on Jan. 29, 2013, now abandoned, which is a continuation of application No. 12/572,930, filed on Oct. 2, 2009, now Pat. No. 8,379,917.

(51) Int. Cl.
*G06K 9/00* (2006.01)
(52) U.S. Cl.
CPC ........ *G06K 9/00248* (2013.01); *G06K 9/00261* (2013.01); *G06K 9/00295* (2013.01)

(58) Field of Classification Search
None
See application file for complete search history.

(56) References Cited

U.S. PATENT DOCUMENTS

| 2004/0117638 | A1* | 6/2004 | Monroe | 713/186 |
| 2007/0013791 | A1* | 1/2007 | Kinoshita et al. | 348/239 |
| 2007/0019077 | A1* | 1/2007 | Park | 348/211.99 |
| 2008/0304706 | A1* | 12/2008 | Akisada et al. | 382/103 |
| 2011/0157370 | A1* | 6/2011 | Livesey | 348/169 |

\* cited by examiner

*Primary Examiner* — David F Dunphy
(74) *Attorney, Agent, or Firm* — Hickman Palermo Becker Bingham LLP

(57) ABSTRACT

A technique is provided for recognizing faces in an image stream using a digital image acquisition device. A first acquired image is received from an image stream. A first face region is detected within the first acquired image having a given size and a respective location within the first acquired image. First faceprint data uniquely identifying the first face region are extracted along with first peripheral region data around the first face region. The first faceprint and peripheral region data are stored, and the first peripheral region data are associated with the first face region. The first face region is tracked until a face lock is lost. A second face region is detected within a second acquired image from the image stream. Second peripheral region data around the second face region are extracted. The second face region is identified upon matching the first and second peripheral region data.

21 Claims, 2 Drawing Sheets

FACE RECOGNITION PERFORMANCE USING ADDITIONAL IMAGE FEATURES

PRIORITY

This application claims benefit under 35 U.S.C. §120 as a Continuation of application Ser. No. 13/753,426, filed on Jan. 29, 2013, which claims the benefit under 35 U.S.C. §120 as a continuation of U.S. patent application Ser. No. 12/572,930, filed on Oct. 2, 2009, now U.S. Pat. No. 8,379,917, the entire contents of both of which are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

BACKGROUND

Face tracking is a recent innovation in digital cameras and related consumer imaging devices such as camera phones and handheld video cameras. Face tracking technologies have been improving to where they can detect and track faces at up to 60 fps (see, e.g., U.S. Pat. Nos. 7,403,643, 7,460,695, 7,315,631, 7,460,694, and 7,469,055, and US publications 2009/0208056, 2008/0267461 and U.S. Ser. No. 12/063,089, which are all assigned to the same assignee and are incorporated by reference). Users have now come to expect high levels of performance from such in-camera technology.

Faces are initially detected using a face detector, which may use a technique such as that described by Viola-Jones which use rectangular Haar classifiers (see, e.g., US2002/0102024 and Jones, M and Viola, P., "Fast multi-view face detection," Mitsubishi Electric Research Laboratories, 2003.

Once a face is detected, its location is recorded and a localized region around that face is scanned by a face detector in the next frame. Thus, once a face is initially detected, it can be accurately tracked from frame to frame without a need to run a face detector across the entire image. The "located" face is said to be "locked" by the face tracker. Note that it is still desirable to scan the entire image or at least selected portions of the image with a face detector as a background task in order to locate new faces entering the field of view of the camera. However, even when a "face-lock" has been achieved, the localized search with a face detector may return a negative result even though the face is still within the detection region. This can happen because the face has been turned into a non-frontal, or profile pose, facing instead either too much up, down, left or right to be detected. That is, a typical face detector can only accurately detect faces in a semi-frontal pose. Face lock may also be lost due to sudden changes in illumination conditions, e.g. backlighting of a face as it passes in front of a source of illumination, among other possibilities such as facial distortions and occlusions by other persons or objects in a scene.

Face Recognition in Cameras

Now that face detection has been quickly adopted as a "must-have" technology for digital cameras, many engineers have begun to consider the problem of performing more sophisticated face analysis within portable imaging devices. Perhaps the most desired of these is to recognize and distinguish between the individual subjects within an image, or to pick out the identity of a particular individual, for example, from a stored set of friends & family members. These applications are examples of what may be referred to generically as face recognition.

Forensic Face Recognition

Face recognition is known from other fields of research. In particular it is known from the areas of law enforcement and from applications relating in immigration control and in the recognition of suspected terrorists at border crossing. Face recognition is also used in applications in gaming casinos and in a range of commercial security applications.

Most of these applications fall into a sub-category of face recognition that may be referred to as forensic face recognition. In such applications a large database of images acquired under controlled conditions—in particular controlled frontal pose and regulated diffuse illumination is used to train a set of optimal basis functions for a face. When a new face is acquired, it is analyzed in terms of these basis functions. A facial pattern, or faceprint, is obtained and matched against the recorded patterns of all other faces from this large database (see, e.g., U.S. Pat. Nos. 7,551,755, 7,558,408, 7,587,068, 7,555,148, and 7,564,994, which are assigned to the same assignee and incorporated by reference). Thus, an individual can be compared with the many individuals from a law-enforcement database of known criminals, or some other domestic or international law-enforcement database of known persons of interest. Such system relies on the use of a large back-end database and powerful computing infrastructure to facilitate a large number of pattern matching comparisons.

Face Recognition in Consumer Devices

In consumer electronics, the use of face recognition is clearly somewhat different in nature than in say law enforcement or security. To begin with, the nature and implementation of face recognition is influenced by a range of factors which cannot be controlled to the same extent as in forensic applications, such as: (i) there are significant variations in the image acquisition characteristics of individual handheld imaging devices resulting in variable quality of face regions; (ii) image acquisition is uncontrolled and thus faces are frequently acquired at extremes of pose and illumination; (iii) there is not a suitable large database of pre-acquired images to facilitate training; (iv) there is not control on the facial appearance of individuals so people can wear different make-up, hairstyles, glasses, beards, etc.; (v) devices are often calibrated to match local demographics or climate conditions—e.g. cameras in California normally expect sunny outdoor conditions, whereas in Northern Europe cloudy, overcast conditions are the norm, and thus the default white balance in these locations will be calibrated differently; (vi) faces are typically acquired against a cluttered background, making it difficult to accurately extract face regions for subsequent analysis. Additional discussion can be found, for example, in Automated sorting of consumer image collections using face and peripheral region image classifiers, IEEE Transactions on Consumer Electronics, Vol. 51, No. 3, August 2005, pp. 747-754 (Corcoran, P.; Costache, G.) and in US 20060140455, Method and component for image recognition to Corcoran et al.

From the above discussion, it can be understood that on a handheld imaging device the face recognition process may be significantly less reliable than in a typical forensic face recognition system. The acquisition of face regions produces less reliable face regions for analysis, the handheld device can hold a much smaller dataset of face patterns for comparison, and the training of new faces typically relies on data input from the user of a camera who may not be professionally trained and may not capture optimal images for training.

SUMMARY OF THE INVENTION

A technique is provided for recognizing faces in an image stream using a digital image acquisition device. A first acquired image is received from an image stream. A first face region is detected within the first acquired image having a given size and a respective location within the first acquired image. First faceprint data uniquely identifying the first face region are extracted along with first peripheral region data around the first face region. The first faceprint and peripheral region data are stored, and the first peripheral region data are associated with the first face region. The first face region is tracked until a face lock is lost. A second face region is detected within a second acquired image from the image stream. Second peripheral region data around the second face region are extracted. The second face region is identified upon matching the first and second peripheral region data.

The storing of peripheral region data may occur within volatile memory.

A database may be provided with an identifier and associated parameters for each of a number of one or more faces to be recognized. Using the database, face recognition may be selectively applied to the first face region to provide an identifier for the first face region.

Second faceprint data uniquely identifying the second face region may be extracted. The first and second faceprint data may be matched, thereby confirming the identifying of the second face region. If they do not match, the identifying of the second face region as being the same as the first face region is discontinued.

Texture information may be retrieved and matched from the first and second peripheral region data.

The detecting and identifying of the second face region may occur within two seconds, or within one second, or less.

A same identifier may be displayed along with the first and second face regions. The identifier may include a nickname of a person associated with the first and second face regions.

Another method is provided for recognizing faces in an image stream using a digital image acquisition device. A first acquired image is acquired from an image stream. A first face region is detected within the first acquired image having a given size and a respective location within the first acquired image. First faceprint data uniquely identifying the first face region are extracted along with first peripheral region data around the first face region. The first faceprint and peripheral region data are stored, including associating the first peripheral region data with the first face region. A first face region combination, including the first face region and peripheral region data, is tracked until face lock is lost. The first face region is identified.

A database may be provided with an identifier and associated parameters for each of a number of one or more faces to be recognized. Using the database, face recognition may be selectively applied to the first face region to provide an identifier for the first face region.

Texture information may be retrieved and matched from the first and second peripheral region data. The image stream may include two or more relatively low resolution reference images.

The image stream may include a series of reference images of nominally a same scene of a main acquired image, such as two or more preview or postview images, and/or one or more images whose exposure period overlaps some part of the exposure duration of a main acquired image.

One or more processor-readable storage media are also provided herein having code embedded therein for programming a processor to perform any of the methods described herein.

A portable, digital image acquisition device is also provided herein, including a lens and image sensor for acquiring digital images, a processor, and a processor-readable medium having code embedded therein for programming the processor to perform any of the methods described herein.

DETAILED DESCRIPTION OF THE EMBODIMENTS

Figure 1:
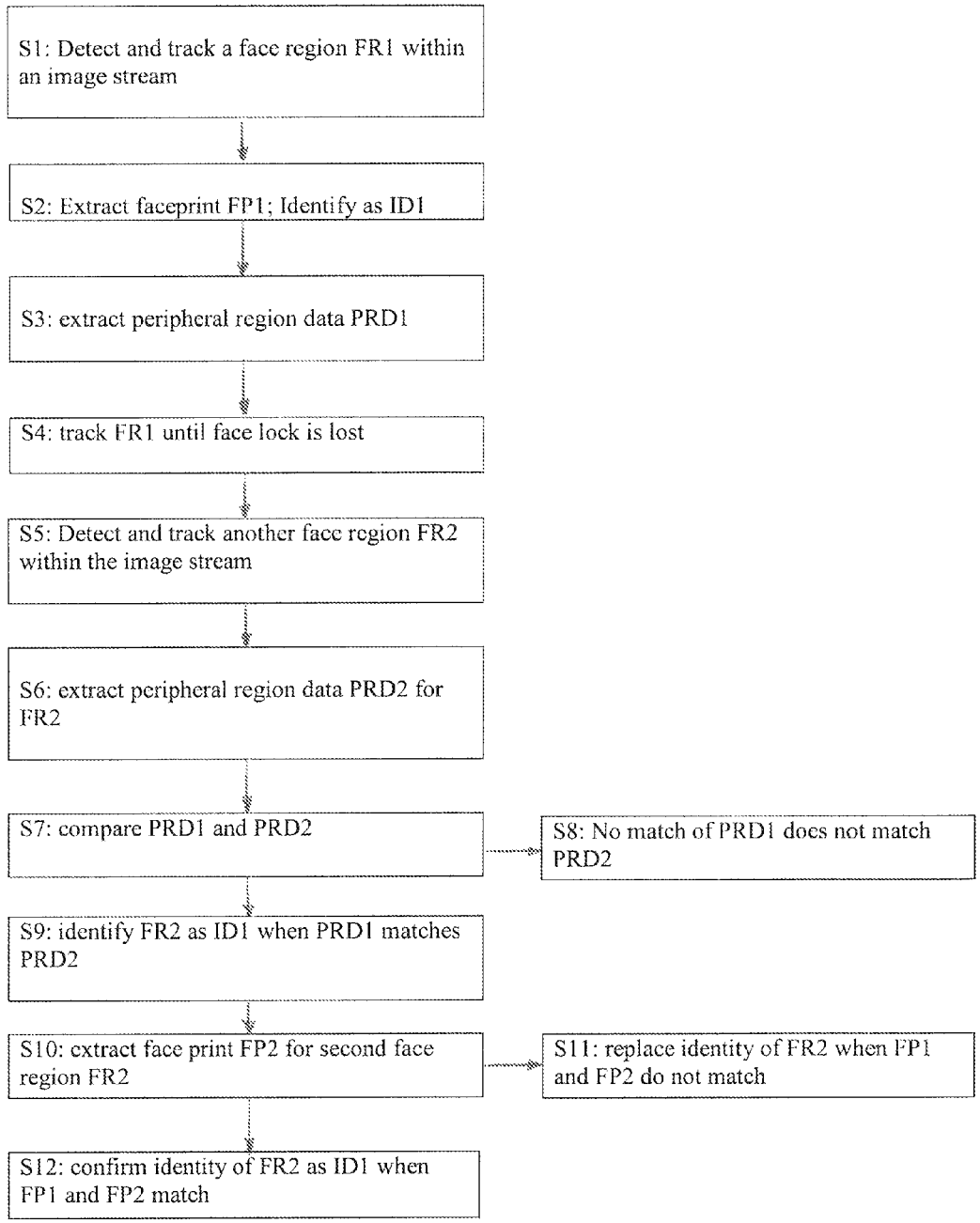
FIG. 1 illustrates exemplary processes in accordance with certain embodiments.

Techniques are described below for improving the performance of an internal person recognition algorithm by using a combination of features extracted from face regions, as well as extra features extracted from regions adjacent to the face, around the face, surrounding the face, proximate to the face, just above, below or to the side of the face, at the periphery of the face. Herein, the term "peripheral regions" shall be used and is intended to include regions adjacent to the face, around the face, surrounding the face, proximate to the face, just above, below, in front, behind or to the side of the face, and/or at the periphery of the face. These extra, peripheral features can tend to be quite invariant to acquisition conditions and can be used, on a temporary basis, for person identification, and/or specifically to maintain a face-lock of a tracked face that is temporarily not detected but will reappear in an image stream upon resuming a more appropriate illumination, direction, pose, orientation or tilt relative to the camera and/or lighting.

The performance of in-camera face identification technology will typically decrease when there are differences in illumination, face pose and/or expression between the current face to be recognized and the face image used for learning the identity of a person. To improve the identification performance, we propose to use information from peripheral regions of the image surrounding the main face. For example, these regions may contain information about clothing, jewelry or electronic equipment being used, cigarette, gum chewing, whistling, shouting, singing, shape of neck and/or shoulders relative to face, shape of face or a feature of the face, scar, tattoo, bandage, brightness, color or tone of face, of a face feature or of a peripheral region, hairstyle, hair color, degree of hair loss, hair covering, toupee, hair on face, in ears or nose or on chest or neck, a hat or helmet, face mask, glasses, umbrella, name tag, label on clothing, or any of a wide variety of other items or features that may distinguish a "peripheral region" around a person's face, which can be used to compliment the identification of an individual.

Certain embodiments described herein are based on using facial features that are sensitive to small variations in face pose, tilt, expression and/or size, or other factors. An advantage is robustness to face variations in pose, tilt, expression and/or size as well as facial occlusions. Very short identification times are achieved.

Current problems with existing solutions are mitigated in certain embodiments described herein by using smart processing techniques. In certain embodiments, these take advantage of technologies now available within state-of-art digital cameras. In particular, multiple face regions may be extracted and pre-filtered from a preview image stream until face regions which are suitable (e.g., with regard to frontal pose and constant illumination) are obtained. Then, the actual pattern matching process of face recognition is initiated.

User Expectations for Face Recognition

Challenges are introduced by the expectations of camera users. It is desired to have a camera with a real-time face tracking facility that can detect and independently track up to nine or more faces in real-time. User expectations for face recognition are and will continue to be quite high. It is further desired not only that a camera will correctly recognize a face captured in a still image, but also that the camera can recognize a face as it tracks the face prior to capturing a still Image.

Now, an in-camera recognition algorithm may typically take several tens of seconds to extract, pre-process and then achieve a reliable initial recognition of a face region. After a camera is first pointed at a scene with several face images, it has been acceptable to have a delay of this order of magnitude. It has been understood by the user that the camera has to "think" about the different faces before it reaches a decision as to the identity of each. However, once the camera has identified a person, it is desired that subsequent recognitions and/or maintaining recognition during tracking should not present serious further delays.

With an analogy being face detection versus face-tracking, where the initial detection takes more time than tracking in subsequent frames, it is desired that while initially recognizing a face region in a preview stream may present some initial delay, it is desired to continue to hold a "face-lock" of a recognized face with the tracking algorithm; maintaining a "memory" of this face. However, when a recognized face leaves the current imaging scene and then re-enters it a short while later, it is desired not to have to repeat the same initial face recognition delays. In the past, a background face detection algorithm would find the face within a second or two, and the face recognition algorithm would not recall the identity of that person within the same timeframe and have to initiate recognition again with unacceptable delays. Thus, the camera is considered to have forgotten the person even though they only left the imaging scene for a few seconds.

In embodiments herein, information contained within peripheral regions, that is, regions of the image surrounding the main face region, are used to improve and refine the sorting of images containing faces (see Automated sorting of consumer image collections using face and peripheral region image classifiers, *IEEE Transactions on Consumer Electronics*, Vol. 51, No. 3, August 2005, pp. 747-754 (Corcoran, P.; Costache, G.). and in US 20060140455, Method and component for image recognition to Corcoran et al., incorporated by reference). In particular these regions contain information that can be used to compliment the identification of an individual, so that sufficient information is maintained throughout the face tracking to maintain face-lock even when the face region itself is not optimally directed, is blocked or partially blocked, and/or illuminated unevenly and/or insufficiently or overly illuminated.

It is noted that in certain embodiments the peripheral regions may be tracked, along with the face regions, and not lost in the first place such that recovery is not necessary. In other embodiments, the peripheral regions are quickly detected after loss of face lock, such that the face detector and face recognition components know to look for the specific face that was lost in the vicinity of the detected peripherals regions. Either way, re-initiating face detection and recognition for the previously identified face is obviated by an advantageous embodiment described herein.

A challenge is to increase the speed at which the identity of a face is recovered after a "face-lock" is lost, or if a face-lock being lost entails initiating face recognition from the beginning, then to increase the duration, proportion and/or probability of maintenance of face-lock over the image stream at least while the particular face actually remains within the scene being imaged with the camera. Again, as re-initiating face recognition is too slow and can lead to gaps of tens of seconds while a suitable new face region is obtained and recognized, it is advantageous as described in embodiments herein to detect and utilize information contained in one or more peripheral regions to maintain the face-lock and/or to recover the identity of a face quickly.

Of note, peripheral regions are generally more texture-based than face regions, such that peripheral regions are more invariant to acquisition conditions. Thus, when a face is first recognized, a process in accordance with certain embodiments extracts and records the textures of these one or more peripheral regions, and associates the peripheral regions, at least on a temporary basis, with the particular recognition profile.

In certain embodiments, the association of peripheral regions with a face region may be temporary in nature, such that the peripheral region data may include volatile data that will eventually be discarded, e.g., when the camera is switched off, or after a fixed time interval (e.g. 1 hour, 1 day), or when the camera moves to a new location which is removed from the current location by a certain distance (e.g. 1000 meters), or when manually reset by the user, or when the identified person is confirmed to have left the scene, or based on combinations of these and some other criteria.

An exemplary process is now described with reference to FIG. 1. At S1, a face is detected in a preview stream and tracking of this face is initiated. At S2, after a good face region FR1 is obtained from the tracked face, then a face pattern FP1 is extracted (referred to as a "faceprint"). Pattern matching is performed to recognize the face region FR1 if its faceprint FP1 matches a stored faceprint. The person corresponding to FR1 is thus identified as ID 1 from a set of known persons. If no match is found, then the person FR1 may be marked as "unknown" unless or until a nickname is provided (a user may be prompted to provide a nickname, otherwise provided an opportunity to do so).

At S3, peripheral region data PRD1 are obtained and analyzed. This peripheral data PRD1 is stored and associated with the identified person from step 2. At S4, the camera continues to track the face region until "face lock" is lost. Before face lock is lost the identified person may be displayed with a tag or other identifier (e.g. writing a nickname beside their face in the display, or using a symbol identifier of selected and/or arbitrary type designated by a user). At S5, a new face FR2 is detected and tracking is initiated. The peripheral regions PRD2 around this face FR2 are extracted at S6. At S7, the PRD2 are compared with peripheral region data which is currently stored, e.g., such as PRD1 associated with lost face region FR1. If a match of PRD1 and PRD2 is determined at S7, then at S9 the face FR2 is temporarily identified (and displayed) as being the person ID1 associated with this peripheral region data PRD2/PRD1, which is the same identifier ID1 used for FR1 before it was lost. If no match can be determined, then the process stops at S8 and no identity information for this face is provided at this time.

At S10, after a good face region FR2 is obtained from the tracked face FR2, then a face pattern or faceprint FP2 is extracted. Pattern matching is performed to recognize the face FR2 and the person is thus identified at S12 from a set of known persons, or marked as "unknown" at S11. Where an identification ID1 was already provided by volatile data this can be confirmed at S12, or replaced at S11 by the identity from the recognition algorithm.

After S11, if peripheral regions and recognized identity did not match, then a new set of volatile peripheral region data PRD2 is created and associated with this new identity ID2. The camera continues to track this face region until "face lock" is lost displaying the identified person (e.g. writing a nickname beside their face in the display), as the process is basically returned with regard to FR2 and ID2 to S4. The volatile data PRD1 and PRD2 is stored within the camera until an extinction event (power-down, count-down, change of location or manual intervention or combinations thereof) occurs whereupon the volatile data is deleted.

Figure 2:
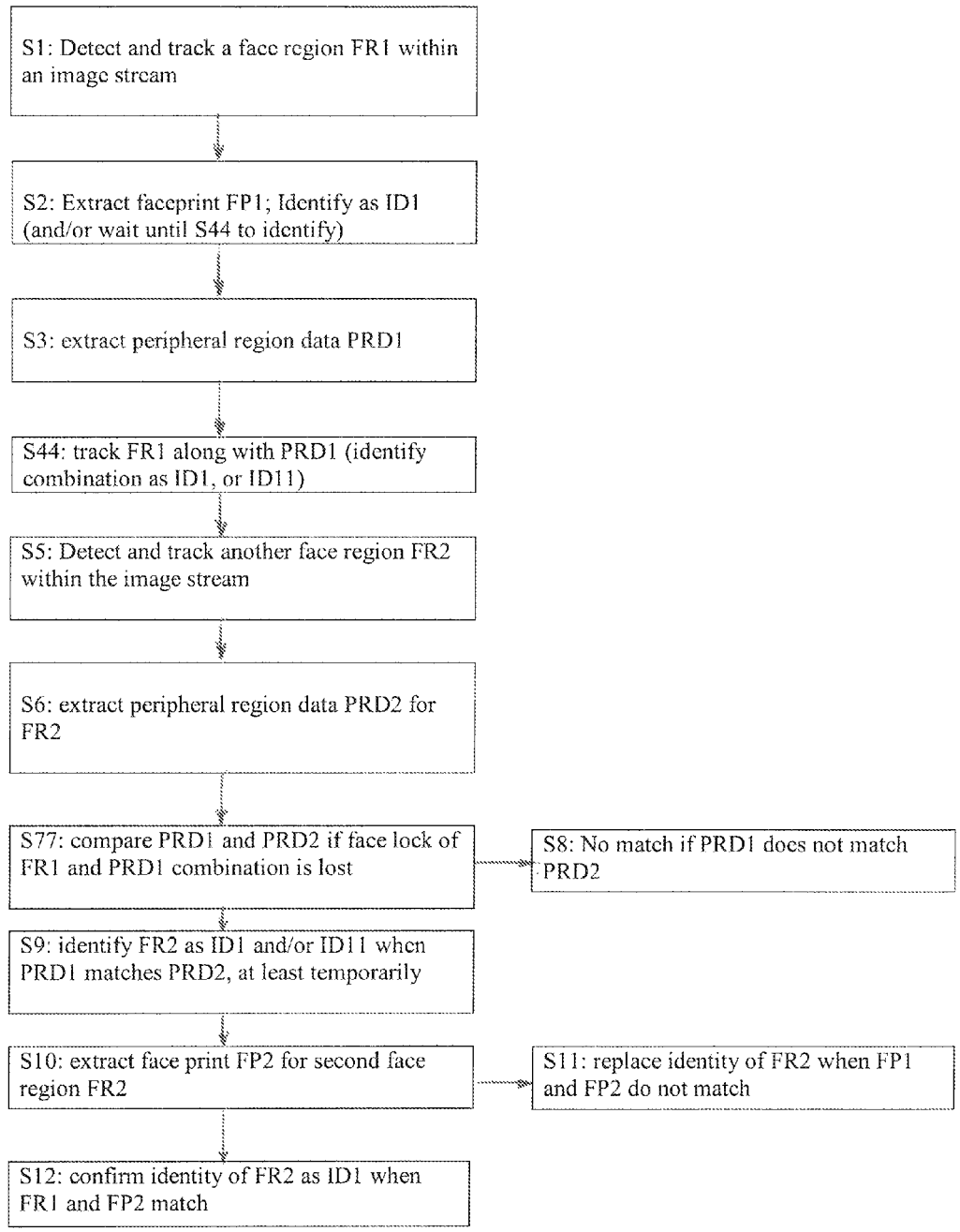
FIG. 2 illustrates exemplary processes in accordance with certain other embodiments.

Referring now to FIG. 2, S1-S3, S5-S6 and S8-S11 are same or similar to those described with reference to FIG. 1, and will not be reiterated here. At S44 in FIG. 2, peripheral region data PRD1 is tracked along with face region FR1. In this embodiment, PRD1 will be stored along with faceprint FP 1 and not deleted with volatile memory on power-down. Either the combination of FR1 and PRD1 can be identified as ID1, or FR1 can be identified as ID1 as in FIG. 1, while the combination of FR1 and PRD1 is differently identified, e.g., as ID11. At S77, PRD1 and PRD2 are compared if face lock of FR1 and PRD1 is lost, although the face lock of this combined data is less likely to become lost than in the embodiment where only FR1 is tracked.

Alternative Embodiments

When a face detector fails, it may still be possible to retain a "face-lock" using other techniques than those described above, or a combination of techniques. For example, face regions have a skin color or skin tone that can be segmented from the background scene, such that even when a face region turns into a profile pose, it can still exhibit a relatively large region of skin color pixels. Thus a skin-color filter can be used to augment the face detector and improve the reliability of a face tracker. Other augmentation techniques can include luminance and edge filters. It is also possible to use stereo audio analysis to track the relative location of a face of a speaker in a scene without visually detecting the face. This can be useful in video conferencing systems, where it is desired to locate the speaker in a group of more than one person. The face tracker may in fact use a combination of techniques to constantly and reliably maintain a coherent lock on a tracked face region.

The face detection process can tend to be relatively time-consuming, and so in some embodiments is not performed on every frame. In some cases, only a portion of each frame is scanned for faces with the face detector (see, e.g., U.S. Ser. No. 12/479,593, filed Jun. 5, 2009, which is assigned to the same assignee and is incorporated by reference), such that the entire frame is scanned over a number of frames, e.g., 5 or 10 frames. The frame portion to be scanned may be changed from frame to frame so that over a sequence of several frames the entire field of view is covered. Alternatively, after initial face detection is performed on the entirety of the image either in a single frame or a sequence of frames, the face detector can change to being applied just to the outside of the frame to locate new faces entering the field of view, while previously detected faces, which may also be recognized and identified, within the frame are tracked.

In certain face tracking systems within digital cameras, multiple faces (e.g., up to 9 in some cameras) can be independently tracked in a single scene. Such face tracker can still be very responsive and exhibit less than a few seconds time lag to detect a new face. The face tracker will independently track the movements of a relatively large number (e.g., nine or more) of faces. Tracking is smooth and highly responsive in almost all acquisition conditions, although at very low light levels performance may be significantly degraded.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited above and below herein, as well as the background, invention summary, abstract and brief description of the drawings, are all incorporated by reference into the detailed description of the preferred embodiments as disclosing alternative embodiments.

The following are incorporated by reference: U.S. Pat. Nos. 7,587,085, 7,587,068, 7,574,016, 7,565,030, 7,564,994, 7,558,408, 7,555,148, 7,551,755, 7,551,754, 7,545,995, 7,515,740, 7,471,846, 7,469,071, 7,469,055, 7,466,866, 7,460,695, 7,460,694, 7,440,593, 7,436,998, 7,403,643, 7,352,394, 6,407,777, 7,269,292, 7,308,156, 7,315,631, 7,336,821, 7,295,233, 6,571,003, 7,212,657, 7,039,222, 7,082,211, 7,184,578, 7,187,788, 6,639,685, 6,628,842, 6,256,058, 5,579,063, 6,480,300, 5,781,650, 7,362,368 and 5,978,519; and U.S. published application nos. 2008/0175481, 2008/0013798, 2008/0031498, 2005/0041121, 2007/0110305, 2006/0204110, PCT/US2006/021393, 2005/0068452, 2006/0120599, 2006/0098890, 2006/0140455, 2006/0285754, 2008/0031498, 2007/0147820, 2007/0189748, 2008/0037840, 2007/0269108, 2007/0201724, 2002/0081003, 2003/0198384, 2006/0276698, 2004/0080631, 2008/0106615, 2006/0077261 and 2007/0071347; and U.S. patent application Ser. Nos. 10/764,339, 11/861,854, 11/573,713, 11/462,035, 12/042,335, 12/063,089, 11/761,647, 11/753,098, 12/038,777, 12/043,025, 11/752,925, 11/767,412, 11/624,683, 60/829,127, 12/042,104, 11/856,721, 11/936,085, 12/142,773, 60/914,962, 12/038,147, 11/861,257, 12/026,484, 11/861,854, 61/024,551, 61/019,370, 61/023,946, 61/024,508, 61/023,774, 61/023,855, 61/221,467, 61/221,425, 61/221,417, 61/091,700, 61/182,625, 61/221,455, 11/319,766, 11/673,560, 12/485,316, 12/374,040, 12/479,658, 12/479,593, 12/362,399, 12/191,304, 11/937,377, 12/038,147, 12/055,958, 12/026,484, 12/554,258, 12/437,464, 12/042,104, 12/485,316, and 12/302,493.

What is claimed is:

1. A method of recognizing a face in an acquired digital image, comprising:
receiving a first acquired image;

detecting, using a processor, a first face region within the first acquired image having a given size and a respective location within the first acquired image;

extracting first faceprint data from the first face region;

determining whether the first faceprint data matches stored faceprint data that is stored in a database with a first identifier, wherein the first identifier identifies a first person corresponding to the stored faceprint data;

extracting first peripheral region data around the first face region;

in response to determining that the first faceprint data matches the stored faceprint data, displaying the first identifier next to the first face region;

receiving a second acquired image that has a second face region;

extracting second peripheral region data around the second face region;

comparing the first peripheral region data and the second peripheral region data;

determining whether the first peripheral region data matches the second peripheral region data;

in response to determining that the first peripheral region data matches the second peripheral region data, using the second face region to at least temporarily identify the first person, and associating the second face region with the first identifier even if a variation exists between the first faceprint data that is included in the first face region and second faceprint data that is included in the second face region.

2. The method of claim 1, further comprising:

associating the first identifier with the first peripheral region data;

storing the first identifier and the first peripheral region data.

3. The method of claim 1, further comprising:

extracting the first faceprint data that uniquely identifies a face pattern of a face depicted in the first face region;

selecting the first identifier by performing pattern matching between the first faceprint data and faceprint data stored for a set of known persons.

4. The method of claim 1, further comprising:

associating the first peripheral region data with a recognition profile of a face depicted in the first face region;

wherein the recognition profile comprises one or more identification parameters of the face.

5. The method of claim 1, wherein the first identifier comprises a name of a person associated with the first face region and the second face region.

6. The method of claim 1, wherein the first identifier comprises a symbol.

7. The method of claim 1, wherein comparing the first peripheral region data and the second peripheral region data comprises comparing texture information from the first peripheral region data and texture information from the second peripheral region data.

8. One or more non-transitory processor-readable storage media storing code instructions embedded therein, the code instructions, when executed by a processor, cause the processor to perform:

receiving a first acquired image;

detecting, using a processor, a first face region within the first acquired image having a given size and a respective location within the first acquired image;

extracting first faceprint data from the first face region;

determining whether the first faceprint data matches stored faceprint data that is stored in a database with a first identifier, wherein the first identifier identifies a first person corresponding to the stored faceprint data;

extracting first peripheral region data around the first face region;

in response to determining that the first faceprint data matches the stored faceprint data, displaying the first identifier next to the first face region;

receiving a second acquired image that has a second face region;

extracting second peripheral region data around the second face region;

comparing the first peripheral region data and the second peripheral region data;

determining whether the first peripheral region data matches the second peripheral region data;

in response to determining that the first peripheral region data matches the second peripheral region data, using the second face region to at least temporarily identify the first person, and associating the second face region with the first identifier even if a variation exists between the first faceprint data that is included in the first face region and second faceprint data that is included in the second face region.

9. The one or more non-transitory processor-readable storage media of claim 8, storing additional instructions which, when executed by the processor, cause:

associating the first identifier with the first peripheral region data;

storing the first identifier and the first peripheral region data.

10. The one or more non-transitory processor-readable storage media of claim 8, comprising additional instructions which, when executed by the processor, cause:

extracting the first faceprint data that uniquely identifies a face pattern of a face depicted in the first face region;

selecting the first identifier by performing pattern matching between the first faceprint data and faceprint data stored for a set of known persons.

11. The one or more non-transitory processor-readable storage media of claim 8, comprising additional instructions which, when executed by the processor, cause:

associating the first peripheral region data with a recognition profile of a face depicted in the first face region;

wherein the recognition profile comprises one or more identification parameters of the face.

12. The one or more non-transitory processor-readable storage media of claim 8, wherein the first identifier comprises a name of a person associated with the first face region and the second face region.

13. The one or more non-transitory processor-readable storage media of claim 8, wherein the first identifier comprises a symbol.

14. The one or more non-transitory processor-readable storage media of claim 8, wherein the code instructions that cause comparing the first peripheral region data and the second peripheral region data comprise additional instructions for comparing texture information from the first peripheral region data and texture information from the second peripheral region data.

15. A portable, digital image acquisition device, comprising:

a lens, an image sensor for acquiring digital images, a processor, and a non-transitory processor-readable storage medium storing code instructions embedded therein for programming the processor, the code instructions, when executed by the processor, cause the processor to perform:

receiving a first acquired image;

detecting, using a processor, a first face region within the first acquired image having a given size and a respective location within the first acquired image;

extracting first faceprint data from the first face region;

determining whether the first faceprint data matches stored faceprint data that is stored in a database with a first identifier, wherein the first identifier identifies a first person corresponding to the stored faceprint data;

extracting first peripheral region data around the first face region;

in response to determining that the first faceprint data matches the stored faceprint data, displaying the first identifier next to the first face region;

receiving a second acquired image that has a second face region;

extracting second peripheral region data around the second face region;

comparing the first peripheral region data and the second peripheral region data;

determining whether the first peripheral region data matches the second peripheral region data;

in response to determining that the first peripheral region data matches the second peripheral region data, using the second face region to at least temporarily identify the first person, and associating the second face region with the first identifier even if a variation exists between the first faceprint data that is included in the first face region and second faceprint data that is included in the second face region.

16. The device of claim 15, wherein the non-transitory processor-readable storage medium comprises additional instructions which, when executed by the processors, cause:
associating the first identifier with the first peripheral region data;
storing the first identifier and the first peripheral region data.

17. The device of claim 15, wherein the non-transitory processor-readable storage medium comprises additional instructions which, when executed by the processors, cause:
extracting the first faceprint data that uniquely identifies a face pattern of a face depicted in the first face region;
selecting the first identifier by performing pattern matching between the first faceprint data and faceprint data stored for a set of known persons.

18. The device of claim 15, wherein the non-transitory processor-readable storage medium comprises additional instructions which, when executed by the processors, cause:
associating the first peripheral region data with a recognition profile of a face depicted in the first face region;
wherein the recognition profile comprises one or more identification parameters of the face.

19. The device of claim 15, wherein the first identifier comprises a name of a person associated with the first face region and the second face region.

20. The device of claim 15, wherein the first identifier comprises a symbol.

21. The device of claim 15, wherein the code instructions that cause comparing the first peripheral region data and the second peripheral region data comprise additional instruction which, when executed by the processors, cause: comparing texture information from the first peripheral region data and texture information from the second peripheral region data.

* * * * *